United States Patent
Shi (10) Patent No.: US 10,598,944 B2
(45) Date of Patent: Mar. 24, 2020

(54) BEAM EXPANDING STRUCTURE AND OPTICAL DISPLAY MODULE

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 193 days.

(21) Appl. No.: 15/935,146

(22) Filed: Mar. 26, 2018

(65) Prior Publication Data

US 2019/0049738 A1 Feb. 14, 2019

(30) Foreign Application Priority Data

Aug. 14, 2017 (CN) .......................... 2017 1 0693448

(51) Int. Cl.
*G02B 27/09* (2006.01)
*G02B 26/08* (2006.01)
(Continued)

(52) U.S. Cl.
CPC ........... *G02B 27/0977* (2013.01); *G02B 6/42* (2013.01); *G02B 26/0833* (2013.01);
(Continued)

(58) Field of Classification Search
None
See application file for complete search history.

(56) References Cited

U.S. PATENT DOCUMENTS 5,724,163 A * 3/1998 David ...................... G02B 3/10
359/15
7,573,640 B2 * 8/2009 Nivon .................. G02B 5/1814
345/7
(Continued)

FOREIGN PATENT DOCUMENTS

CN 1536377 A 10/2004
CN 1685291 A 10/2005
(Continued)

OTHER PUBLICATIONS

First Office Action for Chinese Patent Application No. 201710693448.X dated Jul. 23, 2019.

*Primary Examiner* — Jennifer D. Carruth
(74) *Attorney, Agent, or Firm* — Calfee, Halter & Griswold LLP (57) ABSTRACT

A beam expanding structure and an optical display module are disclosed. The beam expanding structure includes a plurality of transparent substrates in a stacked arrangement. Each transparent substrate includes a first reflective area and a second transflective. In each transparent substrate, the first area is to reflect a light beam incident thereon to the second area of one or more transparent substrate at downstream; the second area is to transmit part of a light beam received from one or more transparent substrate at upstream to an observation point, while reflecting rest of the light beam received from the one or more transparent substrate at upstream back to one or more transparent substrate at upstream; and the second area is further to at least partially reflect a light beam received from one or more transparent substrate at downstream back to one or more transparent substrate at downstream.

20 Claims, 3 Drawing Sheets

(51) Int. Cl.
  *G02B 6/42* (2006.01)
  *G02B 26/10* (2006.01)
  *G02B 27/01* (2006.01)
(52) U.S. Cl.
  CPC .......... *G02B 26/10* (2013.01); *G02B 27/0172* (2013.01); *G02B 2027/0123* (2013.01)

(56) References Cited

U.S. PATENT DOCUMENTS

| | | | |
|---|---|---|---|
| 8,508,848 B2 * | 8/2013 | Saarikko | G02B 5/1814 359/567 |
| 8,634,119 B2 * | 1/2014 | Bablumyan | G03H 1/02 359/11 |
| 9,400,395 B2 * | 7/2016 | Travers | G02B 27/4205 |
| 9,519,089 B1 * | 12/2016 | Brown | G02B 5/18 |
| 10,185,287 B2 * | 1/2019 | Lee | G03H 1/2286 |
| 10,234,686 B2 * | 3/2019 | Vallius | G02B 5/1842 |
| 10,247,943 B1 * | 4/2019 | Yu | G02B 27/0172 |
| 2004/0062502 A1 | 4/2004 | Levola | |
| 2004/0202897 A1 | 10/2004 | Kondo | |
| 2007/0047254 A1 | 3/2007 | Schardt et al. | |
| 2008/0199670 A1 | 8/2008 | Yaoita et al. | |
| 2009/0052008 A1 | 2/2009 | Mcnie et al. | |
| 2009/0322653 A1 * | 12/2009 | Putilin | G02B 17/006 345/8 |
| 2011/0019250 A1 | 1/2011 | Aiki et al. | |
| 2014/0104665 A1 * | 4/2014 | Popovich | G02B 6/0076 359/15 |
| 2015/0055203 A1 | 2/2015 | Maruyama et al. | |
| 2015/0205134 A1 * | 7/2015 | Bailey | G02B 27/0172 345/8 |
| 2015/0260995 A1 * | 9/2015 | Mukawa | G02B 27/0172 345/8 |
| 2016/0349516 A1 * | 12/2016 | Alexander | G02B 27/0103 |
| 2017/0285348 A1 * | 10/2017 | Ayres | G02B 27/144 |
| 2018/0113305 A1 * | 4/2018 | Alexander | G02B 27/01 |

FOREIGN PATENT DOCUMENTS

| | | |
|---|---|---|
| CN | 101243022 A | 8/2008 |
| CN | 101297234 A | 10/2008 |
| CN | 101416081 A | 4/2009 |
| CN | 101963703 A | 2/2011 |
| CN | 203871649 U | 10/2014 |
| CN | 104423035 A | 3/2015 |

\* cited by examiner

BEAM EXPANDING STRUCTURE AND OPTICAL DISPLAY MODULE

CROSS REFERENCE TO RELATED APPLICATION

The present application claims the priority of the Chinese patent application No. 201710693448.X filed on Aug. 14, 2017, the disclosure of which is incorporated herein in its entirety by reference.

FIELD

The present disclosure relates to the field of display technology, and in particular, to a beam expanding structure and an optical display module.

BACKGROUND

Optical display module companies with Lumus as representative have developed an augmented reality optical system based on a stacked array of waveguide structures, wherein a light beam is expanded by the stacked array of waveguide structures in one dimension, whereas in another dimension, an eyepiece with a relatively large aperture is employed to implement transformation of a point-source image of a two-dimensional pixelated image source into a quasi-parallel light beam, thereby ensuring a reasonable exit pupil. However, volumes of the eyepiece and the image source impose extreme limitations on lightening and thinning of the optical display module.

A microelectromechanical system (MEMS) device (e.g., a MEMS micro-mirror) is a new type of control device for light beams, which allows an angular deflection of a light beam around a fixed point and has characteristics such as being compact. Thereby, it has become a display device which has a promising application prospect. Moreover, the scanning light beam emitted from a MEMS micro-mirror is approximately parallel light, which is close to fulfill the requirements for the stacked array of waveguide structures. Therefore, with a combination of the MEMS micro-mirror and the stacked array of waveguide structures, it is easy to lighten and thin the optical display module. However, since the scanning light beam emitted from the MEMS micro-mirror is relatively narrow, there will be problems, such as being difficult for observation when it is directly applied in the stacked array of waveguide structures.

In view of above, how to expand scanning light beams emitted from MEMS micro-mirrors in width and then facilitate its combination with the stacked array of waveguide structure, thereby lightening and thinning the optical display module, is one of those technical problems that is required to be solved urgently at present by those skilled in the art.

SUMMARY

An embodiment of the present disclosure provides a beam expanding structure. Specifically, the beam expanding structure comprises a plurality of transparent substrates in a stacked arrangement. Each transparent substrate comprises a first area that is reflective and a second area that is transflective. The first area of each transparent substrate is configured to reflect a light beam incident thereon to the second area of one or more transparent substrate at downstream. Further, the second area of each transparent substrate is configured to transmit part of a light beam received from one or more transparent substrate at upstream to an observation point, while reflecting rest of the light beam received from the one or more transparent substrate at upstream back to one or more transparent substrate at upstream. In addition, the second area of each transparent substrate is further configured to at least partially reflect a light beam received from one or more transparent substrate at downstream back to one or more transparent substrate at downstream.

According to a possible implementation, in the beam expanding structure provided by an embodiment of the present disclosure, the first area of each transparent substrate is configured for receiving a respective part of an incident light beam from a light source.

According to a possible implementation, in the beam expanding structure provided by an embodiment of the present disclosure, the first area and the second area of each transparent substrate are both formed on a side of the transparent substrate facing an adjacent transparent substrate at downstream.

According to a possible implementation, in the beam expanding structure provided by an embodiment of the present disclosure, in a direction perpendicular to the arrangement direction of the plurality of transparent substrates, the first area of each transparent substrate has a first end and a second end opposite to each other, wherein the first end of the first area is configured to receive a starting boundary ray of light in part of the incident light beam for the transparent substrate, and the second end of the first area is configured to receive an ending boundary ray of light in that part of the incident light beam for the transparent substrate.

According to a possible implementation, in the beam expanding structure provided by an embodiment of the present disclosure, in a direction perpendicular to the arrangement direction of the plurality of transparent substrates, the second area of each transparent substrate has a first end and a second end opposite to each other, wherein the first end of the second area is configured to receive light reflected from the first end of the first area of one or more transparent substrate at upstream, and the second end of the second area is configured to receive light reflected from the second end of the first area of one or more transparent substrate at upstream.

According to a possible implementation, in the beam expanding structure provided by an embodiment of the present disclosure, for each of the transparent substrates, the distance between the first end and the second end of the second area is at least four times as large as the distance between the first end and the second end of the first area.

According to a possible implementation, in the beam expanding structure provided by an embodiment of the present disclosure, the first area of each transparent substrate comprises a reflective film.

According to a possible implementation, in the beam expanding structure provided by an embodiment of the present disclosure, the second area of each transparent substrate comprises a transflective film.

According to a possible implementation, in the beam expanding structure provided by an embodiment of the present disclosure, the first area and the second area of each transparent substrate are in contact with each other.

According to a possible implementation, in the beam expanding structure provided by an embodiment of the present disclosure, the transparent substrates comprise a glass substrate.

An embodiment of the disclosure further provides an optical display module. To be specific, the optical display module comprises: a beam expanding structure as described above, a laser light source, a microelectromechanical system (MEMS) micro-mirror and a stacked array of waveguide structures. Further, the MEMS micro-mirror is configured for transforming a light beam emitted from the laser light source into a scanning light beam with image information, and enabling the scanning light beam to be emitted out onto the beam expanding structure. In addition, the beam expanding structure is configured for expanding the scanning light beam in a first dimension, and for converging the expanded scanning light beam onto the stacked array of waveguide structures. Further, the stacked array of waveguide structures is configured for expanding the expanded scanning light beam in a second dimension.

According to a possible implementation, the optical display module provided by an embodiment of the present disclosure further comprises: a reflector located in a light path between the MEMS micro-mirror and the beam expanding structure. Specifically, the reflector is configured for reflecting the scanning light beam onto the beam expanding structure.

DETAILED DESCRIPTION OF THE EMBODIMENTS

In the following, specific implementations of the beam expanding structure and the optical display module provided by embodiments of the present disclosure will be described in detail in connection with the drawings. It should be noted that, the embodiments described herein are just part of the embodiments of the present disclosure, and not all of them. Based on the embodiments described herein, all the other embodiments, obtained by those of ordinary skills in the art under the premise of not paying out creative work, shall fall within the protection scope of the present disclosure.

Figure 1A:
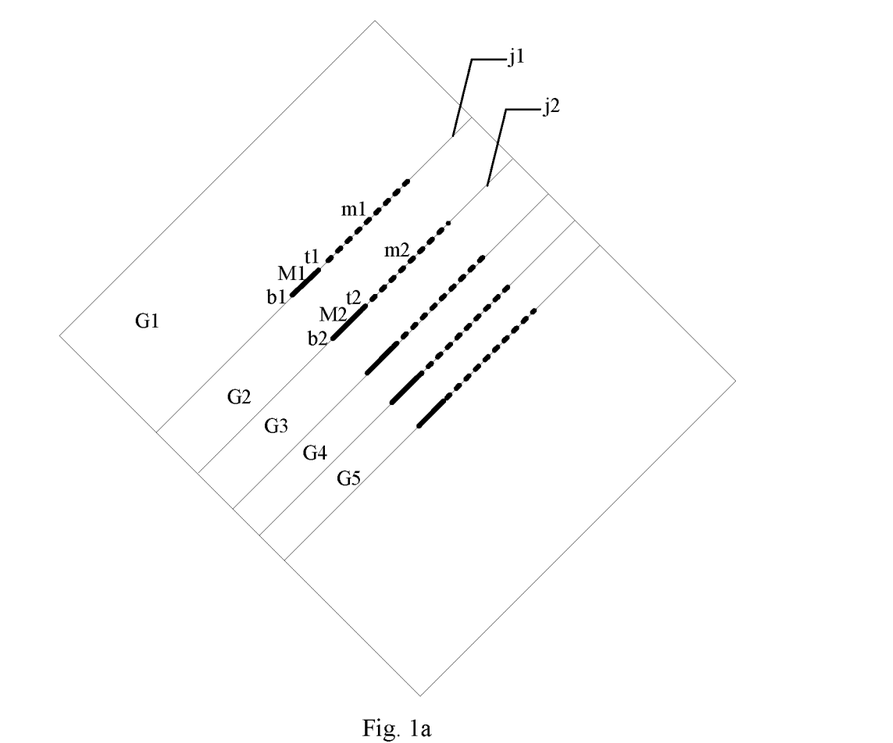
FIG. 1a and FIG. 1b are structural diagrams of a beam expanding structure according to an embodiment of the present disclosure.
Figure 1B:
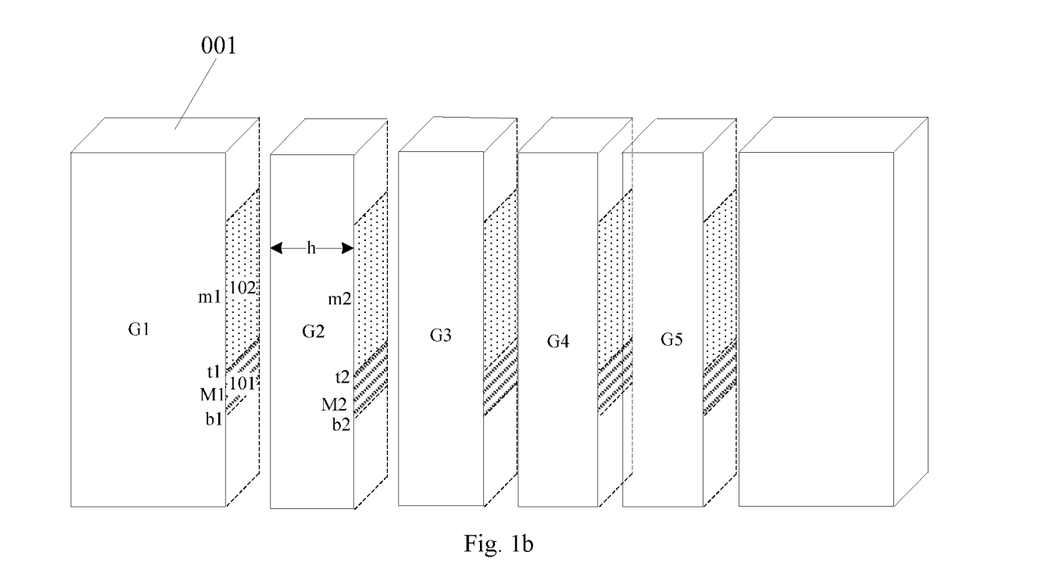
Figure 2:
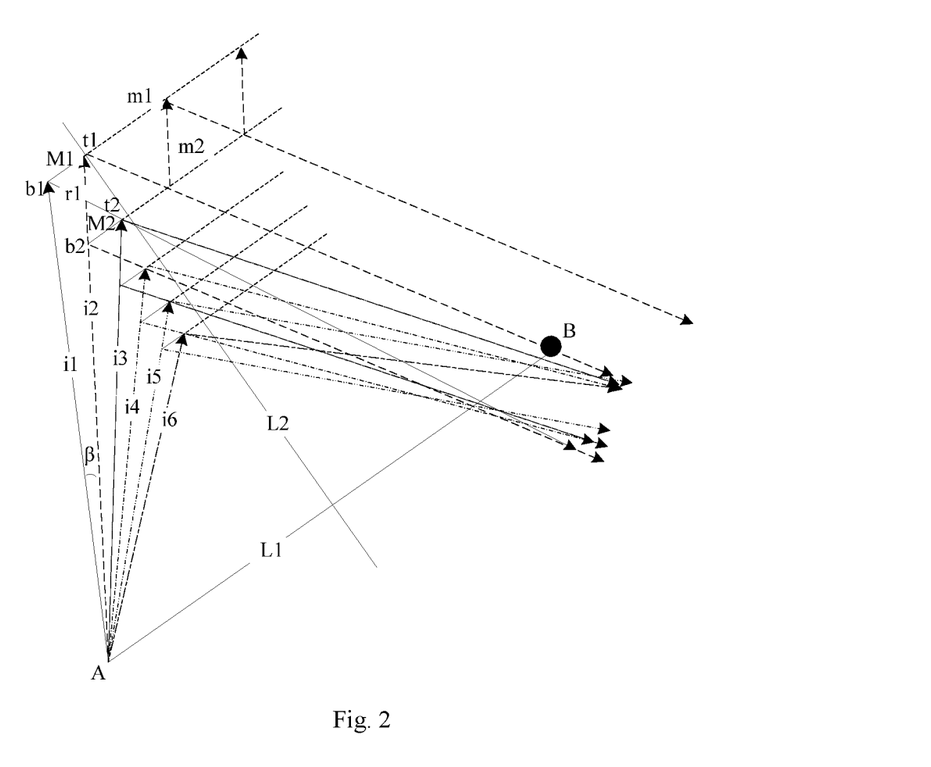
FIG. 2 is a schematic design diagram of a beam expanding structure according to an embodiment of the present disclosure.

An embodiment of the present disclosure provides a beam expanding structure. As shown in FIG. 1a and FIG. 1b, the beam expanding structure specifically comprises: a plurality of transparent substrates 001 disposed in order from left to right. That is, the plurality of transparent substrates 001 is in a stacked arrangement. Each transparent substrate 001 comprises a first reflective area 101 and a second transflective area 102. Such a beam expanding structure can implement expansion of an incident light beam in one dimension. For example, in FIG. 1b, different parts of an incident light beam may be incident from the bottom of each transparent substrates 001, and eventually emitted out from the right side of the whole beam expanding structure after several times of reflection or transmission. In view of this, it can be seen that in an optical propagation path, relative to the leftmost transparent substrate G1, the transparent substrates G2, G3, G4, G5 disposed on the right side are all in a downstream position. Similarly, as compared with the rightmost transparent substrate G5, the transparent substrates G4, G3, G2, G1 disposed on the left side are all in an upstream position. In this context, expressions such as "upstream" and "downstream" are used to illustrate a specific position of various optical components, which should be appreciated by those skilled in the art. Further, as shown in FIG. 2, the first area 101 of an individual transparent substrate 001 disposed in front or at upstream is configured for reflecting an incident light beam onto the second area 102 of one or more transparent substrates 001 disposed at back or at downstream. Further, the second area 102 of an individual transparent substrate 001 disposed at back or downstream is configured for transmitting part of the received incident light beam to an area where the observation point B is located, and in the meanwhile, reflecting the remaining part of the received incident light beam to the second area 102 of one or more transparent substrates 001 disposed in front or at upstream. In addition, the second area 102 of an individual transparent substrate 001 disposed in front or at upstream is configured for at least partially reflecting the received incident light beam, which is reflected by the second area of one or more transparent substrates disposed at back or downstream, to the second area 102 of one or more transparent substrates 001 disposed at back or downstream.

Again, it is worth noting that, as similar to the terms such as "upstream" and "downstream" employed above, in embodiments of the present disclosure, expressions such as "disposed in front" and "disposed at back" refer to a relative positioning between various transparent substrates 001. For example, a first transparent substrate 001 on the far left is disposed in front relative to a second transparent substrate 001 on its right side, whereas the second transparent substrate 001 is disposed at back relative to the first transparent substrate 001.

In addition, since the second area 102 of an individual transparent substrate 001 has a reflection function and a transmission function simultaneously, incident light may be transmitted and reflected thereon, as long as it illuminates the second area 102 of the individual transparent substrate 001.

Figure 3:
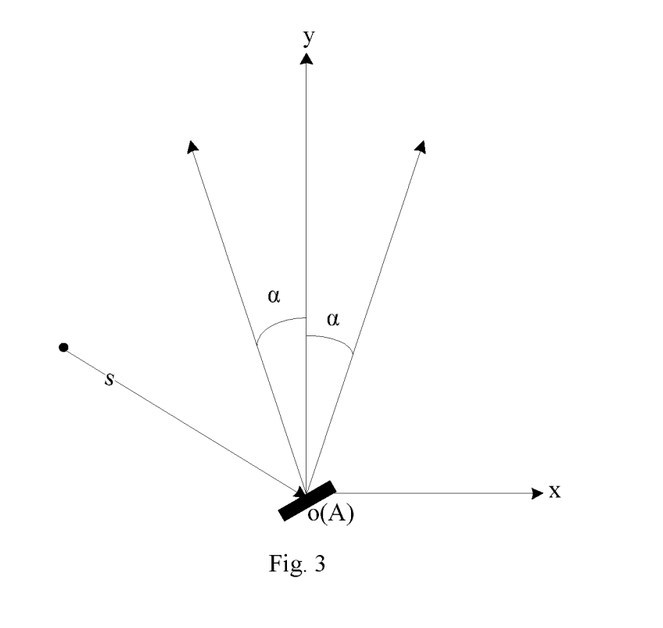
FIG. 3 is a schematic diagram of a scanning light beam emitted from a MEMS micro-mirror according to an embodiment of the present disclosure.

In the beam expanding structure provided by an embodiment of the present disclosure, by using the first area 101 of an individual transparent substrate 001 disposed in front or at upstream to reflect an incident light beam to the second area 102 of one or more transparent substrates 001 disposed at back or downstream, and by rendering the second area 102 of an individual transparent substrate 001 disposed at back or downstream and the second area 102 of an individual transparent substrate 001 disposed in front or at upstream to cooperate with each other, expansion of the incident light beam is accomplished. In addition, in an actual application, a scanning light beam emitted out from the MEMS micro-mirror may be used as the incident light beam. Specifically, FIG. 3 shows a scanning light beam emitted out from the MEMS micro-mirror. As can be seen, the MEMS micro-mirror converts the incident light s into a scanning light beam. Suppose that the axis center A of the MEMS micro-mirror is located at the coordinate origin o, the scanning light beam outputted by the MEMS micro-mirror in the xoy plane will be located in the range of $\alpha$ degrees on both sides of the y-axis. With combination of the beam expanding structure, the MEMS micro-mirror and the stacked array of waveguide structures, it is easy to lighten and thin the optical display module, thus obtaining a compact optical display module.

It should be noted that in the beam expanding structure provided by an embodiment of the disclosure, the first area 101 and the second area 102 of each transparent substrate 001 may not only be located on the same side of the transparent substrate 001 simultaneously, but also disposed on two opposite sides of the transparent substrate 001 respectively, which will not be defined here.

In addition, to facilitate description of the first area 101 and the second area 102 of each transparent substrate 001, FIG. 1b shows a schematic diagram of various transparent substrates 001 in the beam expanding structure before they are fit to each other. In an actual application, the various transparent substrates 001 fit closely.

According to a specific embodiment, in order to implement maximum expansion of an incident light beam, in the beam expanding structure provided by an embodiment of the present disclosure, each part of the incident light beam is reflected on the first area 101 of a respective transparent substrate 001. In other words, each part of the incident light beam is in a one-to-one correspondence with the first area 101 of one transparent substrate 001, and is reflected on the first area 101 of the corresponding transparent substrate 001. Optionally, to facilitate design of the beam expanding structure, in the beam expanding structure provided by an embodiment of the present disclosure, in different parts of the incident light beam corresponding to the first areas 101 of different transparent substrates 001 respectively, the angle between the starting boundary ray of light and the ending boundary ray of light is identical. Of course, according to a specific embodiment, in different parts of the incident light beam corresponding to the first areas 101 of different transparent substrates 001 respectively, the angle between the starting boundary ray of light and the ending boundary ray of light may also not be identical, and the present disclosure is not limited in this regard.

According to a specific embodiment, in the beam expanding structure provided by an embodiment of the present disclosure, the first area 101 of the first transparent substrate 001 disposed at the most upstream has a first end b1 and a second end t1 which are opposite to each other. As shown in FIG. 1b, the first end b1 and the second end t1 are two ends of the first transparent substrate G1 in a vertical direction. In this case, the arrangement direction of the plurality of transparent substrates 001 is in the horizontal direction, i.e., being perpendicular to the vertical direction. Further, with reference to FIG. 2, the first end b1 of the first area 101 may receive the starting boundary ray of light i1 in part of the incident light beam (i.e., the part between the boundary rays of light i1 and i2) for the transparent substrate, whereas the second end t1 of the first area 101 may receive the ending boundary ray of light i2 in that part of the incident light beam for the transparent substrate.

Similarly, according to other embodiments, with respect to the two ends of a transparent substrate G2 disposed at downstream of the first transparent substrate G1, namely, the first end b2 and the second end t2, they may be configured in the same way. In other words, the first end b2 may receive the boundary ray of light i2, and the second end t2 may receive the boundary ray of light i3. For the two ends of other transparent substrates 001, they may be set in a similar way, and the present disclosure will not be repeated any longer in this regard. Based on the same consideration, and with continued reference to FIG. 2, the second area 102 of each transparent substrate 001 also has opposite first end t2 (which may coincide with the second end of the first area 101) and second end m2. In particular, the first end t2 of the second area 102 may receive light reflected from the first end b1 of the first area 101 of one or more transparent substrate 001 at upstream, whereas the second end m2 of the second area 102 may receive light reflected from the second end t1 of the first area 101 of one or more transparent substrate 001 at upstream.

With respect to specific design procedures of the two ends of the first area 101 and the second area 102 in each transparent substrate 001, it will be further described in detail in the following. According to a specific embodiment, in the beam expanding structure provided by an embodiment of the present disclosure, the first area 101 of each transparent substrate 001 may comprise a reflective film. Accordingly, the second area 102 of each transparent substrate 001 may comprise a transflective film. Thus, corresponding functions of the first area 101 and the second area 102 for each transparent substrate 001 may be implemented.

Accordingly, in the beam expanding structure provided by an embodiment of the present disclosure, the distance between two adjacent reflective films is equal to the thickness of the transparent substrate 001 located between these two adjacent reflective films. Similarly, the distance between two adjacent transflective films is equal to the thickness of the transparent substrate 001 located between these two adjacent transflective films.

According to a specific embodiment, in the beam expanding structure provided by an embodiment of the present disclosure, the distance between the two ends t2 and m2 of the second area 102 in each transparent substrate 001 is at least four times as large as the distance between the two ends b1 and t1 of the first area 101. In this way, the incident light beam will be reflected at least twice on the second area 102 of each transparent substrate 001, thereby being beneficial to the expansion of the incident light beam.

According to a specific embodiment, in the beam expanding structure provided by an embodiment of the present disclosure, the first area 101 and the second area 102 of each transparent substrate 001 are in contact with each other. Using such a disposition, all the rays of light in the incident light beam may be expanded by means of the second areas 102 of the transparent substrates 001.

According to a specific embodiment, in the beam expanding structure provided by an embodiment of the present disclosure, the transparent substrates 001 may be a glass substrate.

Apparently, the transparent substrates 001 may also be other substrates well known to the skilled in the art, for example, a plastic substrate, which have a good light-transmissive effect, and the present disclosure is not limited in this regard.

To better illustrate the technical solution of the present disclosure, in the following, a scanning light beam emitted out from the MEMS micro-mirror will be used as the incident light beam, and the design principle and specific implementation of the beam expanding structure provided by an embodiment of the present disclosure will be described in detail.

In particular, as shown in FIG. 2, a design diagram of the beam expanding structure provided by an embodiment of the present disclosure is shown. A scanning light beam from the MEMS micro-mirror is successively divided into five sub-scanning light beams, and the scanning range of each sub-scanning light beam is identical, namely, is β degrees. In addition, for the sake of convenience, boundaries of these sub-scanning light beams are shown to be rays of light i1, i2, i3, i4, i5 and i6, respectively.

Next, the design principle for the beam expanding structure according to an embodiment of the present disclosure will be described in detail with reference to FIG. 2.

First of all, the position of a first section M1 corresponding to a sub-scanning light beam encircled by the ray of light i1 and the ray of light i2 is determined. In particular, positions of the axis center A of the MEMS micro-mirror and the observation point B are determined; the perpendicular bisector L2 of a connection line L1 between the axis center A of the MEMS micro-mirror and the observation point B is constructed; the intersection point t1 between the perpendicular bisector L2 and the ray of light i2 is determined; and a straight line perpendicular to the perpendicular bisector L2 is drawn, wherein the intersection point t1 is used as the pedal, such that the straight line intersects the ray of light i1 at point b1. Thereby, the intersection point b1 and the intersection point t1 are the two end points of the first line segment M1 (corresponding to the boundary of the first area of the first transparent substrate).

Further, the position of a second line segment M2 (corresponding to the boundary of the first area of the second transparent substrate) corresponding to a sub-scanning light beam encircled by the ray of light i2 and the ray of light i3 is determined. In particular, the intersection point t2 between the reflected ray of light r1 for the ray of light i1 after it is reflected by the main reflection area M1 and the ray of light i3 is determined; and a normal line of the perpendicular bisector L2 is drawn crossing the intersection point t2, such that the perpendicular line intersects the light ray of i2 at point b2. Thereby, the intersection point b2 and the intersection point t2 are the two end points of the second line segment M2. It can be seen that the second line segment M2 is parallel to the first line segment M1.

Afterwards, using a method similar to that for determining position of the second line segment M2, positions of various line segments corresponding to sub-scanning light beams encircled by the ray of light i2 and the ray of light i3, the ray of light i3 and the ray of light i4, as well as the ray of light i4 and the ray of light i5 respectively, may be determined.

Those transparent substrates 001, which are in a one-to-one correspondence with the above five sub-scanning light beams, are denoted as G1, G2, G3, G4 and G5, respectively. As shown in FIG. 1a, the first line segment M1 is an orthographic projection of the first area 101 of G1 on the boundary j1, and the second line segment M2 is an orthographic projection of the first area 101 of G2 on the boundary j2. Similarly, orthographic projections of the first area 101 of G3, the first area 101 of G4 and the first area 101 of G5, on the boundaries may be determined respectively.

Optionally, the distance between the two ends of the second area may be set to be at least four times as large as the distance between the two ends of the first area, such that each sub-scanning light beam may be reflected at least twice on the second area of a corresponding transparent substrate 001. For example, the length of the second section extending from the end point t1 is at least four times as large as the length of the first line segment M1, and the extended line segment m1 of the second section is just the orthographic projection of the second area 102 of G1 on the boundary j1. FIG. 2 shows a light path diagram for the ray of light i2 after being reflected twice on the extended line segment m1.

The first area 101 of G1 corresponding to the first line segment M1 may comprise a reflective film, and the second area 102 of G1 corresponding to the extended line segment m1 may comprise a transflective film.

The thickness h is selected to be equal to the distance between the first line segment M1 and the second line segment M2, as shown in FIG. 1b. In addition, using a method similar to that for implementing the reflective film and the transflective film of G1, the reflective films and the transflective films of G2, G3, G4 and G5 may be implemented respectively.

The individual transparent substrates 001 are successively adhered together in the order of G1, G2, G3, G4 and G5, and surfaces of the individual transparent substrates 001 provided with the reflective films and the transflective films are designed to face toward the same side. In this case, the distance between two adjacent reflective films is equal to the thickness of the transparent substrate 001 therebetween. For example, the distance between the reflective film corresponding to the first line segment M1 and the reflective film corresponding to the second line segment M2 is equal to the thickness h of G2. Likewise, the distance between two adjacent transflective films is also equal to the thickness of the transparent substrate 001 therebetween.

For example, the distance between the transflective film corresponding to the extended line segment m1 of the first line segment M1 and the transflective film corresponding to the extended line segment m2 of the second line segment M2 is equal to the thickness h of G2.

Figure 4:
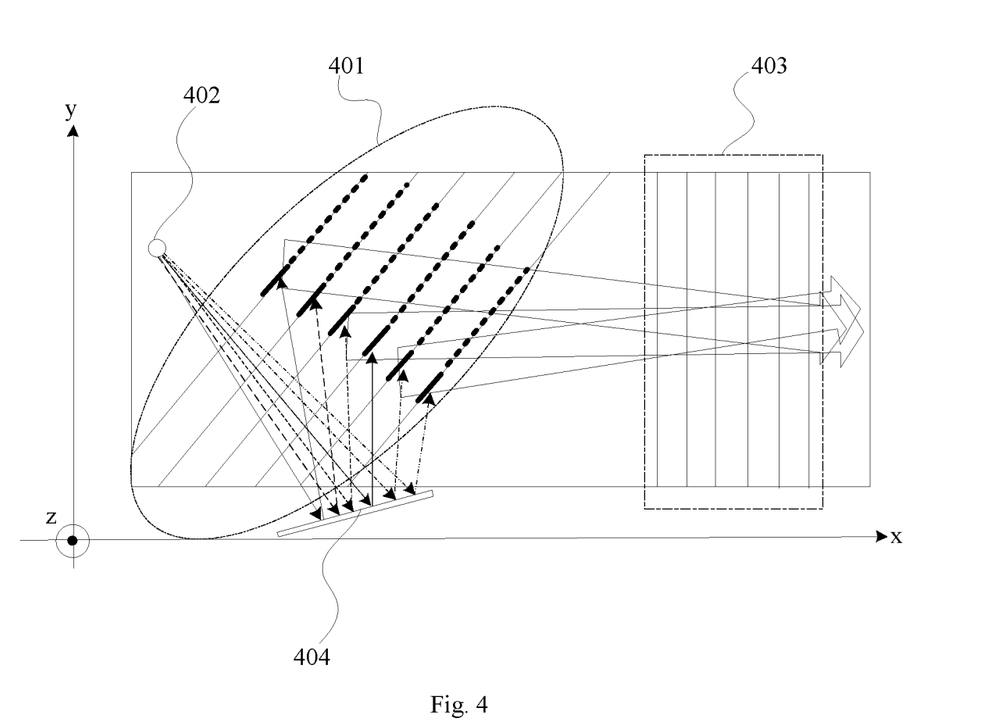
FIG. 4 is a structural diagram of an optical display module according to an embodiment of the present disclosure.

Based on the same concept, an embodiment of the present disclosure further provides an optical display module. As shown in FIG. 4, the optical display module comprises a beam expanding structure 401 as described above, a laser light source, a microelectromechanical system (MEMS) micro-mirror 402 and a stacked array of waveguide structures 403. In particular, the MEMS micro-mirror 402 may be configured for transforming a light beam emitted from the laser light source into a scanning light beam with image information, and enabling the scanning light beam to be emitted out onto the beam expanding structure. In addition, the beam expanding structure 401 may be configured for expanding the received scanning light beam in a first dimension and then converging the expanded scanning light beam onto the stacked array of waveguide structures 403. In particular, the beam expanding structure 401 may expand the scanning light beam in the x-y plane. Further, the stacked array of waveguide structures 403 may be configured for expanding the expanded scanning light beam further in a second dimension. In particular, the stacked array of waveguide structures 403 may expand the scanning light beam further in the x-z plane.

As can be seen from the above description, by using the beam expanding structure 401 and the stacked array of waveguide structures 403, expansion of the scanning light beam in two dimensions may be accomplished jointly. In this way, the goal of expanding a thin light beam emitted out from the MEMS micro-mirror is achieved, thereby being benefit to the observation of an observer.

According to a specific embodiment, as shown in FIG. 4, the optical display module provided by an embodiment of the present disclosure may further comprise a reflector 404 located in a light path between the MEMS micro-mirror 402 and the beam expanding structure 401, wherein the reflector 404 may be used for reflecting the scanning light beam onto the beam expanding structure 401. In this way, it is easy to reduce the distance between the MEMS micro-mirror 402 and the beam expanding structure 401.

Embodiments of the present disclosure provide a beam expanding structure and an optical display module. The beam expanding structure comprises a plurality of transparent substrates in a stacked arrangement, wherein each of the transparent substrates comprises a first reflective area and a second transflective area. By using the first area of a transparent substrate disposed in front or at upstream, an incident light beam is reflected to the second area of a transparent substrate disposed at back or downstream. Further, by using the second area of a transparent substrate disposed at back or downstream and the second area of a transparent substrate disposed in front in cooperative with each other, expansion of the incident light beam is accomplished. In an actual application, a scanning light beam emitted out from the MEMS micro-mirror may be used as the incident light beam, thereby being benefit to the combination of the MEMS micro-mirror and the stacked array of waveguide structures, and in turn being helpful to lighten and thin the optical display module and obtain a compact optical display module.

It should be noted that in this context, relational terms such as first, second, etc. are only used to distinguish one entity or operation from another entity or operation, and does not necessarily require or imply there is any such an actual relation or order between these entities or operations. Clearly, various modifications and variations may be made to the present disclosure by the skilled in the art without departing from the spirit and scope of the present disclosure. As such, the present disclosure is also intended to include all these modifications and variations, if the modifications and variations of the present disclosure pertain to the protection scope of the claims of the present disclosure and the equivalence thereof.

The invention claimed is:

1. A beam expanding structure, comprising: a plurality of transparent substrates in a stacked arrangement, each transparent substrate comprising a first area that is reflective and a second area that is transflective, wherein the first area of each transparent substrate is configured to reflect a light beam incident thereon to the second area of one or more transparent substrate at downstream, the second area of each transparent substrate is configured to transmit part of a light beam received from one or more transparent substrate at upstream to an observation point, while reflecting rest of the light beam received from the one or more transparent substrate at upstream back to one or more transparent substrate at upstream, and the second area of each transparent substrate is further configured to at least partially reflect a light beam received from one or more transparent substrate at downstream back to one or more transparent substrate at downstream.

2. The beam expanding structure as claimed in claim 1, wherein the first area of each transparent substrate is configured for receiving a respective part of an incident light beam from a light source.

3. The beam expanding structure as claimed in claim 2, wherein the first area and the second area of each transparent substrate are both formed on a side of the transparent substrate facing an adjacent transparent substrate at downstream.

4. The beam expanding structure as claimed in claim 3, wherein in a direction perpendicular to an arrangement direction of the plurality of transparent substrates, the first area of each transparent substrate has a first end and a second end being opposite to each other, wherein the first end of the first area is configured to receive a starting boundary ray of light in part of the incident light beam for the transparent substrate, whereas the second end of the first area is configured to receive an ending boundary ray of light in that part of the incident light beam for the transparent substrate.

5. The beam expanding structure as claimed in claim 4, wherein in a direction perpendicular to the arrangement direction of the plurality of transparent substrates, the second area of each transparent substrate has a first end and a second end being opposite to each other, wherein the first end of the second area is configured to receive light reflected from the first end of the first area of one or more transparent substrate at upstream, whereas the second end of the second area is configured to receive light reflected from the second end of the first area of one or more transparent substrate at upstream.

6. The beam expanding structure as claimed in claim 5, wherein in each transparent substrate, a distance between the first end and the second end of the second area is at least four times as large as a distance between the first end and the second end of the first area.

7. The beam expanding structure as claimed in claim 5, wherein two adjacent transparent substrates are in direct contact with each other.

8. The beam expanding structure as claimed in claim 7, wherein the first area of each transparent substrate comprises a reflective film.

9. The beam expanding structure as claimed in claim 7, wherein the second area of each transparent substrate comprises a transflective film.

10. The beam expanding structure as claimed in claim 1, wherein the first area and the second area of each transparent substrate are in contact with each other.

11. The beam expanding structure as claimed in claim 1, wherein the transparent substrates comprise a glass substrate.

12. An optical display module, comprising:
a beam expanding structure as claimed in claim 1,
a laser light source,
a MEMS micro-mirror, and
a stacked array of waveguide structures, wherein
the MEMS micro-mirror is configured for transforming a light beam emitted from the laser light source into a scanning light beam with image information, and enabling the scanning light beam to be emitted onto the beam expanding structure;
the beam expanding structure is configured for expanding the scanning light beam in a first dimension and converging an expanded scanning light beam onto the stacked array of waveguide structures; and
the stacked array of waveguide structures is configured for expanding the expanded scanning light beam further in a second dimension.

13. The optical display module as claimed in claim 12, further comprising a reflector in a light path between the MEMS micro-mirror and the beam expanding structure, wherein the reflector is configured for reflecting the scanning light beam onto the beam expanding structure.

14. The optical display module as claimed in claim 12, wherein the first area of each transparent substrate is configured for receiving a respective part of an incident light beam from a light source.

15. The optical display module as claimed in claim 14, wherein the first area and the second area of each transparent substrate are both formed on a side of the transparent substrate facing an adjacent transparent substrate at downstream.

16. The optical display module as claimed in claim 15, wherein in a direction perpendicular to an arrangement direction of the plurality of transparent substrates, the first area of each transparent substrate has a first end and a second end being opposite to each other, wherein the first end of the first area is configured to receive a starting boundary ray of light in part of the incident light beam for the transparent substrate, whereas the second end of the first area is configured to receive an ending boundary ray of light in that part of the incident light beam for the transparent substrate.

17. The optical display module as claimed in claim 16, wherein in a direction perpendicular to the arrangement direction of the plurality of transparent substrates, the second area of each transparent substrate has a first end and a second end being opposite to each other, wherein the first end of the second area is configured to receive light reflected from the first end of the first area of one or more transparent substrate at upstream, whereas the second end of the second area is configured to receive light reflected from the second end of the first area of one or more transparent substrate at upstream.

18. The optical display module as claimed in claim 17, wherein in each transparent substrate, a distance between the first end and the second end of the second area is at least four times as large as a distance between the first end and the second end of the first area.

19. The optical display module as claimed in claim 17, wherein two adjacent transparent substrates are in direct contact with each other.

20. The optical display module as claimed in claim 12, wherein the first area and the second area of each transparent substrate are in contact with each other.

* * * * *